US008281346B2

(12) United States Patent
Choi et al.

(10) Patent No.: US 8,281,346 B2
(45) Date of Patent: Oct. 2, 2012

(54) METHOD AND APPARATUS FOR UTILIZING DVD CONTENT THROUGH HOME NETWORK

(75) Inventors: Sang-sun Choi, Suwon-si (KR); Young-goo Ko, Anyang-si (KR); Jeong-ja Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 575 days.

(21) Appl. No.: 11/633,462

(22) Filed: Dec. 5, 2006

(65) Prior Publication Data

US 2007/0143815 A1    Jun. 21, 2007

(30) Foreign Application Priority Data

Dec. 5, 2005    (KR) .................. 10-2005-0117671

(51) Int. Cl.
*H04N 7/18*    (2006.01)
*H04N 7/173*   (2011.01)
*H04N 7/08*    (2006.01)

(52) U.S. Cl. ............. 725/80; 725/82; 725/133; 725/141
(58) Field of Classification Search ........................ None
See application file for complete search history.

(56) References Cited

U.S. PATENT DOCUMENTS

| 5,055,922 | A  |   | 10/1991 | Wessling |
|---|---|---|---|---|
| 7,340,152 | B1 | * | 3/2008 | Talstra et al. ................. 386/94 |
| 7,346,265 | B2 | * | 3/2008 | Takigawa et al. ............. 386/94 |
| 7,617,514 | B2 | * | 11/2009 | Szucs et al. ..................... 725/85 |
| 2002/0044760 | A1 | * | 4/2002 | Shirakawa et al. ............. 386/65 |
| 2002/0107865 | A1 |   | 8/2002 | Rotem et al. |
| 2002/0126597 | A1 | * | 9/2002 | Kim ........................... 369/47.24 |
| 2003/0009668 | A1 |   | 1/2003 | Chan et al. |
| 2003/0086688 | A1 |   | 5/2003 | Saeki et al. |
| 2003/0145338 | A1 | * | 7/2003 | Harrington ................... 725/136 |
| 2004/0136698 | A1 | * | 7/2004 | Mock ............................ 386/123 |
| 2004/0175098 | A1 | * | 9/2004 | Calhoon et al. ................ 386/46 |
| 2004/0243694 | A1 |   | 12/2004 | Weast |

(Continued)

FOREIGN PATENT DOCUMENTS

| CN | 1167793 A | 5/1997 |
|---|---|---|
| EP | 1 308 956 A1 | 5/2003 |
| KR | 1020050077881 A | 8/2005 |
| WO | 2005/008385 A2 | 1/2005 |

OTHER PUBLICATIONS

UPnP AV Architecture:0.83 for UPnP™ Version 1.0 Status: Preliminary Design (TPD) Date: Jun. 12, 2002.*

(Continued)

*Primary Examiner* — Brian Pendleton
*Assistant Examiner* — Ryan Stronczer
(74) *Attorney, Agent, or Firm* — Sughrue Mion, PLLC

(57) ABSTRACT

A method and apparatus for utilizing DVD content through a home network are provided. The method includes transmitting item information indicating DVD content in response to a request for a content list, and receiving a request for the DVD content in units of a sector from a client having acquired the item information, and extracting and transmitting data of the requested sector to the client. Various functions provided by the DVD video can be utilized similar to reproducing DVD content through a local DVD player while reproducing DVD content stored in a remote server through devices of a home network. Therefore, it is possible to reduce concerns of the DVD copyrighter about illegal copying of the content since encoded data is transmitted as it is, without being decoded.

11 Claims, 17 Drawing Sheets

U.S. PATENT DOCUMENTS

| | | | |
|---|---|---|---|
| 2005/0015805 A1* | 1/2005 | Iwamura | 725/79 |
| 2005/0076304 A1 | 4/2005 | Shing | |
| 2005/0144517 A1* | 6/2005 | Zayas | 714/8 |
| 2005/0201726 A1* | 9/2005 | Malcolm et al. | 386/94 |
| 2005/0223240 A1* | 10/2005 | Miles | 713/193 |
| 2005/0254370 A1* | 11/2005 | Hedensten | 369/47.1 |
| 2006/0002246 A1* | 1/2006 | Emberty et al. | 369/30.03 |
| 2006/0026162 A1* | 2/2006 | Salmonsen et al. | 707/10 |
| 2006/0037057 A1* | 2/2006 | Xu | 725/90 |
| 2006/0123093 A1* | 6/2006 | Kawamura | 709/206 |
| 2006/0133391 A1* | 6/2006 | Kang et al. | 370/401 |
| 2007/0033419 A1* | 2/2007 | Kocher et al. | 713/193 |
| 2007/0118766 A1* | 5/2007 | Li Fo Sjoe | 713/193 |
| 2007/0174545 A1* | 7/2007 | Okada et al. | 711/112 |
| 2008/0279063 A1* | 11/2008 | Nakamura | 369/47.15 |

OTHER PUBLICATIONS

RenderingControl:1 Service Template Version 1.01 1 RenderingControl:1 Service Template Version 1.01 for UPnP™ Version 1.0 Status: Standardized DCP Date: Jun. 25, 2002.*

MediaServer:1 Device Template Version 1.01 for UPnP™ Version 1.0 Status: Standardized DCP Date: Jun. 25, 2002.*

MediaRenderer:1 Device Template Version 1.01 for UPnP™ 1.0 Status: Standardized DCP Date: Jun. 25, 2002.*

AVTransport:1 Service Template Version 1.01 for UPnP™ Version 1.0 Status: Standardized DCP Date: Jun. 25, 2002.*

ContentDirectory:1 Service Template Version 1.01 for UPnP™ Version 1.0 Status: Standardized DCP Date: Jun. 25, 2002.*

ConnectionManager:1 Service Template Version 1.01 for UPnP™ Version 1.0 Status: Standardized DCP Date: Jun. 25, 2002.*

Ritchie J et al: "UPnP AV Architecture: 0.83"; Design Document Microsoft; Jun. 12, 2002; pp. 1-22; XP002271673.

Microsoft Corporation: "Microsoft DirectShow SDK", Internet Citation, Aug. 26, 1998, XP002331569 Retrieved from the Internet: URL:http://sdks.icarusindie.com:2004/index.php?sortby=title& dir=sdks%2Fdirectx+6%2Fsdk% 2FDXMEDIA%2FDXMEDIA%2FHELP%2F>[retrieved on Jun. 6, 2005].

Anonymous: "MaestroLink—Networked DVD Player Solution", Internet Citation. [Online] 2003, XP002346405 Retrieved from the Internet: URL:http://web.archive.org/web/20040405082035/http://www.zoran.com/products/maestrolink/index.html>[retrieved on Sep. 23, 2005].

* cited by examiner

FIG. 1B (RELATED ART)

```
<DIDL-Lite xmlns:dc="http://purl.org/dc/elements/1.1/" xmlns:upnp="urn:schemas-upnp-org:
metadata-1-0/upnp/" xmlns="urn:schemas-upnp-org:metadata-1-0/DIDL-Lite/">
<item id="5" parentID="3" restricted="false">
<dc:title>Matrix Title #1</dc:title>
<dc:creator>Warner Brothers</dc:creator>
<upnp:class>object.item.videoItem.movie</upnp:class>
<res protocolInfo="http-get:*:video/mpeg:*"  size="90000000">
http://192.168.0.11:8080/DVDReader.cgi?title=1&Drive=F
</res>
</item>
</DIDL-Lite>
```

FIG. 2B (RELATED ART)

```
<DIDL-Lite xmlns:dc="http://purl.org/dc/elements/1.1/" xmlns:upnp="urn:schemas-upnp-org:
metadata-1-0/upnp/" xmlns="urn:schemas-upnp-org:metadata-1-0/DIDL-Lite/">
<item id="5" parentID="3" restricted="false">
<dc:title>VTS_01_1.VOB</dc:title>
<dc:creator>Warner Brothers</dc:creator>
<upnp:class>object.item.videoItem.movie</upnp:class>
<res protocolInfo="http-get:*:video/mpeg:*"      size="40000000">
http://192.168.0.11:8080/VTS_01_1.VOB
</res>
</item>
</DIDL-Lite>
```

FIG. 6A (RELATED ART)

| Command | Description |
|---|---|
| LinkPGCN | Start at program chain number |
| LinkPTTN | Start at part of title(chapter) number |
| LinkPGN | Start at program number |
| LinkCN | Start at cell number |
| LingTopPGC | Restart current PGC |
| LinkTailPGC | Go to end of current PGC (excute post command) |
| LinkPrevPGC | Start at previous PGC |
| LinkNextPGC | Start at next PGC |
| LinkGoUpPGC | Start at higher PGC |
| LinkPGCN | Start at specific PGC number |
| LinkPTTN | Start at specific chapter number |
| LinkTopPG | Restart current program |
| LinkPrevPG | Start at previous program |
| LinkNextPG | Start at next program |
| LingPGN | Start at specific program number |
| RSM | Resume at location where playback was suspended by CallSS or MenuCall user operation |

FIG. 6B (RELATED ART)

| Command | Description |
|---|---|
| JumpTT | Start at title number(from VGM) |
| JumpVTS_TT | Start at title number(in same VTS) |
| CallSS | Start at a menu PGC number in system space, saving resume state |
| JumpSS | Start at PGC number in system space(from system space) |
| JumpVTS_PTT | Start at part of title(chapter) number in title number(in same VTS) |
| Exit | Stop(enter stop state) |

FIG. 11B

```
<DIDL-Lite xmlns:dc="http://purl.org/dc/elements/1.1/" xmlns:upnp="urn:schemas-upnp-org:metadata-1-0/upnp/" xmlns="urn:schemas-upnp-org:metadata-1-0/DIDL-Lite/">
<item id="5" parentID="3" restricted="false">
<dc:title>Matrix</dc:title>
<dc:creator>Warner Brothers</dc:creator>
<upnp:class>object.item.videoItem.dvd</upnp:class>
<res protocolInfo="http-get:*:video/mpeg:SAMSUNG.COM_FN=DVD_PS_NTSC_SUPPORT_SECTOR_ACCESS" duration="02:45:00" xmlns:samsung="urn:schema-samsung.com" xmlns="urn:schema-samsung.com.metadata-1-0">
http://192.168.0.11/Matrix/Matrix.dvd
</res>
</item>
</DIDL-Lite>
```

FIG. 13B

```
GET /Matrix/Matrix.dvd HTTP/1.1
Host: 192.168.0.11
Keep-Alive:on
DVDSectorRange: sector=0-7
```

FIG. 13C

```
HTTP/1.1 200 OK
Date: Wed, 15 Nov 1995 06:25:24 GMT
Last-Modified: Wed, 15 Nov 1995 04:58:08 GMT
```
Disc-Key: yes
Title-Key: yes
Content-Type: application/vnd.pwg-multiplexed;
              type="application/octet-stream"

CHK 1 2048 LAST
  Content-ID: <49568.46000xxx@foo.com>
  Content-Type: application/octet-stream
  Content-Location: http://192.168.0.11/Matrix/disckey.dat
  Content-Disposition: attachment << Disk Key Data >>

CHK 2 5 LAST
  Content-ID: <49568.46001xxx@foo.com>
  Content-Location: http://192.168.0.11/Matrix/titlekey.dat
  Content-Type: application/octet-stream
  Content-Disposition: attachment << Title Key Data>>

CHK 3 8192 LAST
  Content-ID: <49568.46001xxx@foo.com>
  Content-Location: http://192.168.0.11/Matrix/Matrix.dvd
  DVD-Sector-Range: sector 8-15/472022
  Content-Type: application/octet-stream
  Content-Disposition: attachment <<part of binary data>>

CHK 3 8192 LAST
  <<part of binary data>>

CHK 0 0 LAST

METHOD AND APPARATUS FOR UTILIZING DVD CONTENT THROUGH HOME NETWORK

CROSS-REFERENCE TO RELATED PATENT APPLICATION

This application claims priority from Korean Patent Application No. 10-2005-0117671, filed on Dec. 5, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to utilizing Digital Versatile Disk (DVD) content through a home network.

2. Description of the Related Art

A DVD player is a multimedia player widely used in modern homes. It is widely used because the DVD player provides high quality content and a variety of additional functions, which are not available in theaters, such as a user interaction function, a number of storyline functions, and a parental control function, achieved by utilizing the large storage capacity of a DVD. Accordingly, the DVD has gradually become a substitute for compact discs (CD) and existing analog mediums including a video tape recorder (VTR).

With the generalization of networked audio/video (AV) products at home, devices having a network capability are increasingly gaining popularity. In addition, there are increasing demands from users to utilize not only local content but also internet content in any of the users' home devices using a media server connected to the Internet through a network.

The DVD content can be reproduced by remote devices as well as local devices in a streaming manner by utilizing a network. In this regard, an extensive study needs to be conducted in the standardization of the home network. At present, however, when the DVD content is reproduced by remote devices, the remote devices are only able to reproduce the content in the DVD and the additional functions provided by the DVD, such as changes in title, menus and chapters and a variety of storylines, cannot be used.

In the existing standard, for example, a method of describing a DVD video disc as a content item is not defined in the Content Directory Service (CDS) standard for a universal Plug and Play (UPnP) media server. In allowing a device to utilize DVD content of a remote server in the home network based on the existing UPnP AV architecture, a method of accessing the DVD content in units of a title and a method of accessing the DVD content in units of a file is available in the related art. Details thereof will be described below.

FIG. 1A is a flowchart showing a method of utilizing the DVD content in units of a title in a home network based on a related art UPnP AV architecture. A UPnP media server extracts title information from a video manager information file at the time of loading a DVD disc and generates content item information on a content directory service. An example of the item information is shown in FIG. 1B. A user requests a UPnP media renderer to reproduce content specified by the content item information using a UPnP control point. The URL information included in this content item information enables access to the content in units of a DVD title.

In the method shown in FIG. 1A, even when the video manager information is analyzed by the UPnP media server and DVD video content is provided in units of a title, it is not possible to utilize the real menu screen provided by the DVD disc. Accordingly, there is an inconvenience in that the user has to manually find a main title of the DVD while unnecessarily reproducing the DVD.

FIG. 2A is a flowchart showing a method of utilizing DVD content in units of a file in a related art UPnP AV architecture.

The UPnP media server can generate the content item information on the basis of files seen from a file system when items for the DVD are configured by a content directory service (CDS). FIG. 2B shows an example of the item information that can be used in the method shown in FIG. 2A. Similarly, in this case, there is an inconvenience in that the user, who wants to utilize items existing on the UPnP media server using a UPnP control point, has to manually find video object set (VOB) files constituting the desired title by requesting reproduction of all the files.

In the known methods, the user needs to manually reproduce the whole DVD in order to find the desired title. In addition, since the original menu screen unique to the DVD is not available, the user cannot utilize a graphic user interface (GUI) that is the most suitable for representing characteristics of the contents. In addition, since it is not possible to navigate between program chains (PGCs) at the time of reproducing a specific DVD title in a streaming manner, the various additional functions provided by the DVD video, such as the parental control function or a camera angle changing function, are not available.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for utilizing DVD content through a home network, in which the DVD content is reproduced in a streaming manner through the home network by utilizing functions provided through a local DVD player, such as a navigation function or an interaction function.

According to an aspect of the present invention, there is provided a method of providing DVD content through a server on a home network, the method comprising: (a) transmitting item information indicating DVD content in response to a request for a content list; and (b) receiving a request for the DVD content in units of a sector from a client which has acquired the item information, and extracting and transmitting data of the requested sector to the client.

The item information may include information, indicating that reproduction of the DVD content is permitted in units of a sector, and a Uniform Resource Identifier (URI) of the DVD content. In (b), when the data of the requested sector is encoded using a Content Scrambling System (CSS), the data of the requested sector is transmitted together with a disc key and a title key for decoding.

According to another aspect of the present invention, there is provided a computer-readable medium having embodied thereon a computer program for executing the method of providing DVD content through a server on a home network.

According to still another aspect of the present invention, there is provided a server for providing DVD content through a home network, the server comprising: a list request processor transmitting item information indicating DVD content in response to a request for a content list; and a remote request processor receiving a request for the DVD content in units of a sector from a client which has acquired the item information, and extracting and transmitting data of the requested sector to the client.

According to still another aspect of the present invention, there is provided a method of reproducing DVD content of a remote server through a client on a home network, the method comprising: identifying the DVD content with reference to item information of the content received from the server; acquiring video manager information and video title set information (VTSI) of the DVD content from the server; and requesting data of the DVD content in units of a sector with reference to the acquired information.

According to still another aspect of the present invention, there is provided a computer-readable medium having embodied thereon a computer program for executing the method of reproducing DVD content of a remote server through a client on a home network.

According to still another aspect of the present invention, there is provided a client for reproducing DVD content of a remote server through a home network, the client comprising: a DVD identifying unit identifying the DVD content with reference to item information of the DVD content received from the server; an information acquisition unit acquiring video manager information and video title set information (VTSI) of the DVD content from the server; and a data requesting unit requesting data of the DVD content in units of a sector with reference to the acquired information.

BRIEF DESCRIPTION OF THE DRAWINGS

The above and other aspects of the present invention will become more apparent by describing in detail exemplary embodiments thereof with reference to the attached drawings in which:

FIG. 1B is a diagram showing an example of content item information on a content directory service (CDS) used in FIG. 1A;

FIG. 2B is a diagram showing an example of content item information on a CDS used in FIG. 2A;

FIGS. 6A and 6B are diagrams showing an example of a related art DVD navigation command;

FIG. 11B is a diagram showing an example of content item information used in the process illustrated in FIG. 11A;

FIGS. 13B and 13C are diagrams showing exemplary structures of messages used in the process illustrated in FIG. 13A.

DETAILED DESCRIPTION OF EXEMPLARY EMBODIMENTS OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail with reference to the attached drawings.

In the following description, it is assumed that a home network is based on UPnP AV architecture.

First, a data structure of a related art DVD disc will be described in order to gain a better understanding of the present invention.

Figure 1A:
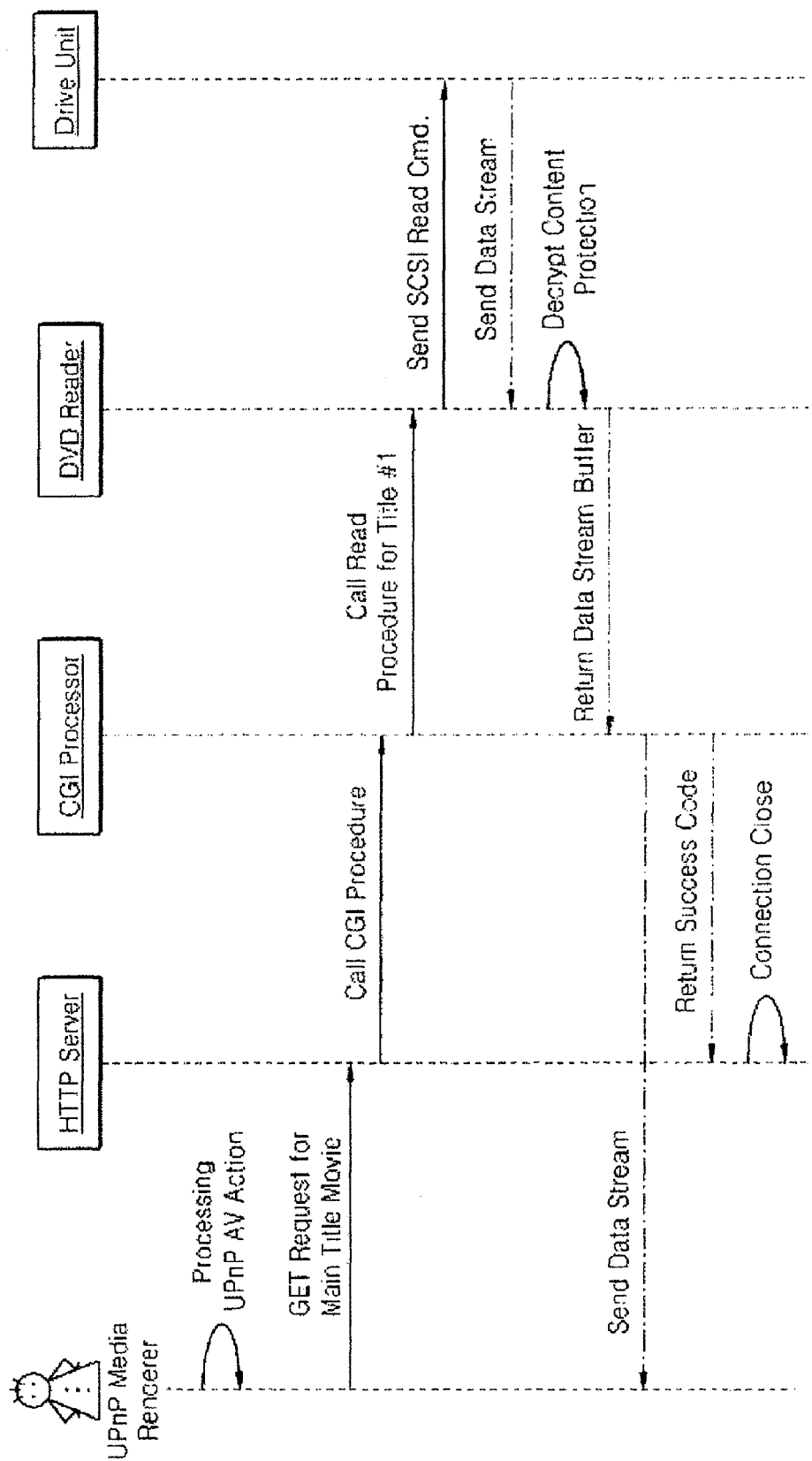
FIG. 1A is a flowchart showing a method of utilizing DVD content in units of a title in a related art universal Plug and Play (UPnP) audio/video (AV) architecture.
Figure 2A:
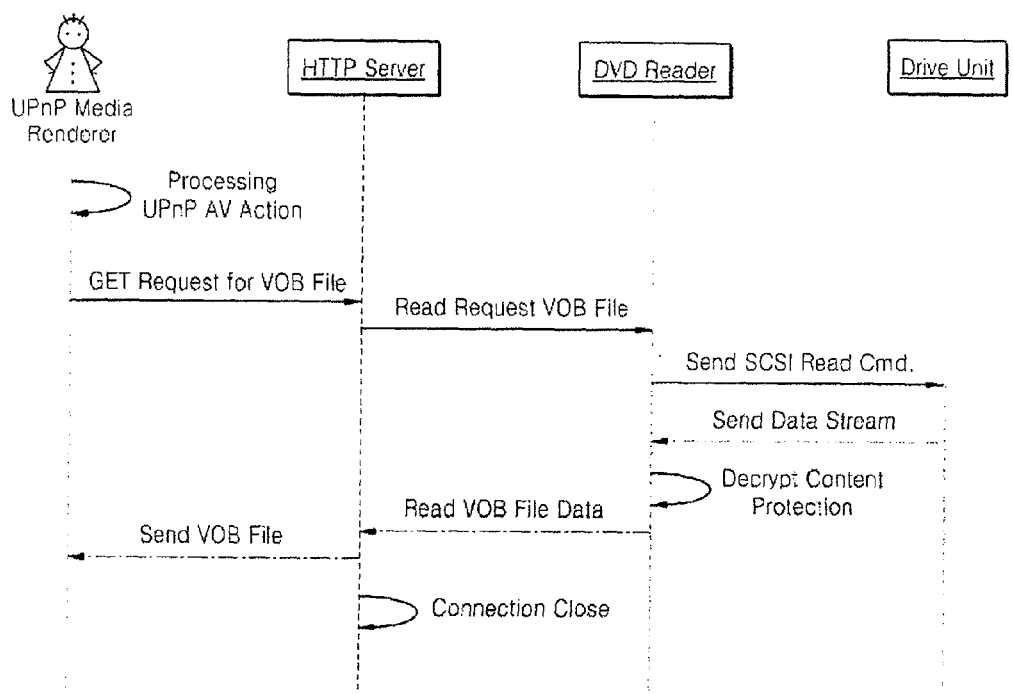
FIG. 2A is a flowchart showing a method of utilizing DVD content in units of a file in a related art UPnP AV architecture.
Figure 3:
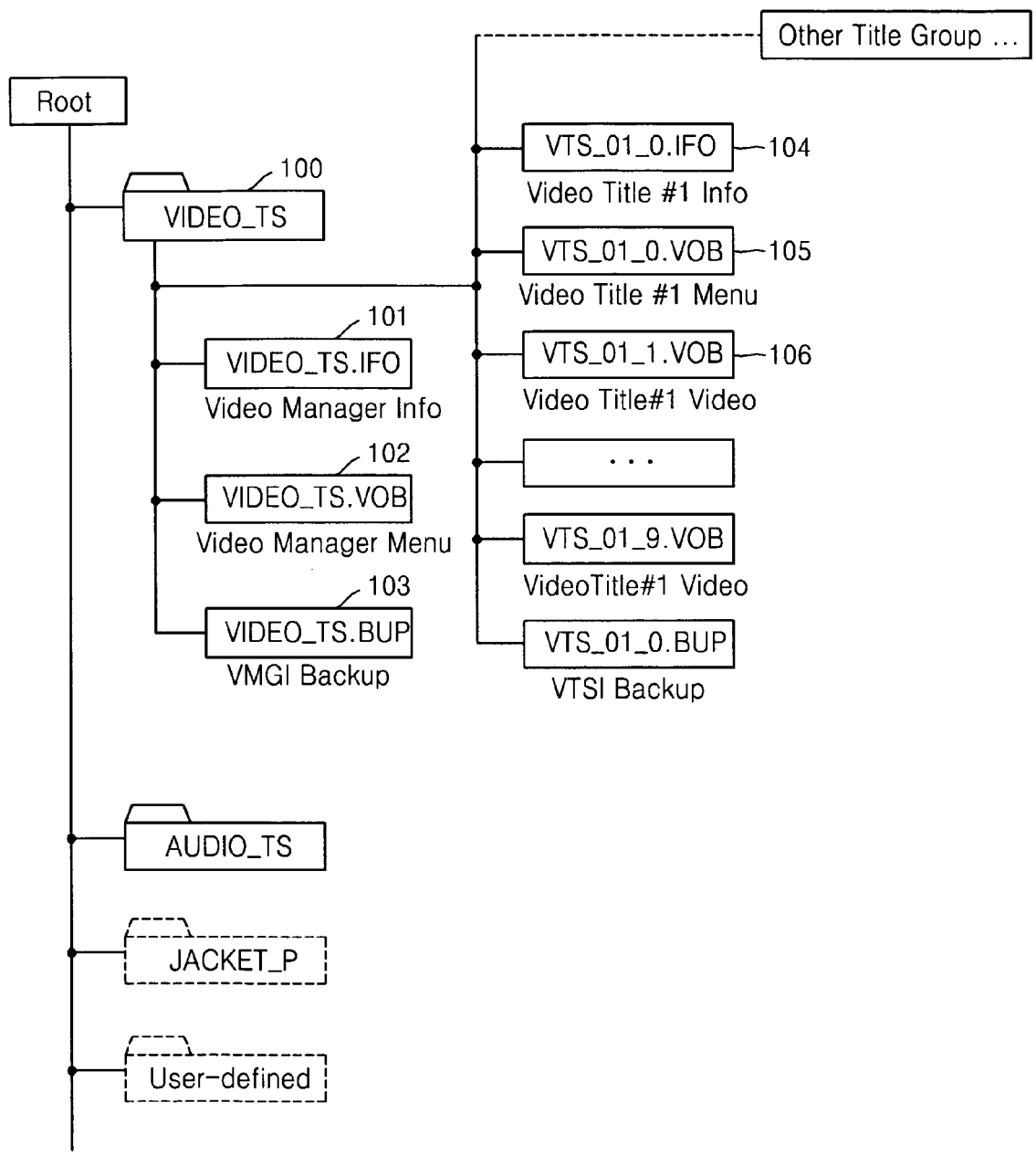
FIG. 3 is a diagram showing an exemplary file structure of a related art DVD.

FIG. 3 is a diagram showing an exemplary file structure of a related art DVD.

The DVD has a folder structure in which a root drive branches into a VIDEO_TS folder 100 and an optional AUDIO_TS folder. The VIDEO_TS folder 100 contains a VIDEO_TS.IFO file 101 storing video manager information, a VIDEO_TS.VOB file 102 storing screen data for displaying the top menu that is displayed first when a DVD title is inserted into a DVD player, and a VIDEO_TS.BUP file 103 as a backup file of the VIDEO_TS.IFO file 101.

In addition, the VIDEO_TS folder 100 further contains files constituting a video title set, the files include a VTS_01_0.IFO file 104 storing information of a first video title, a VTS_01_0.VOB file 105 storing screen menu data, a VTS_01_1.VOB file 106 storing actual data of the first video title, a VTS_01_2.VOB file, and the like. For example, a single DVD may contain from 1 to 99 video title sets.

FIGS. 4A to 4D are diagrams showing exemplary data structures of a related art video title set (VTS).

Figure 4A:
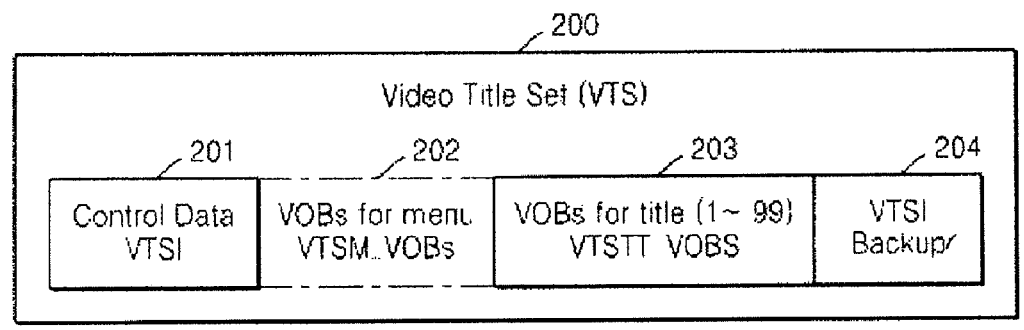
FIGS. 4A to 4D are diagrams showing exemplary data structures of a related art video title set (VTS)

FIG. 4A illustrates a structure of the video title set 200 constituting a single video title. Video title set information (VTSI:VTS_0X0.IFO) 201 containing control information of the title includes information on a program chain (PGC) constituting the title, correlation information between programs constituting the program chain, and correlation information between a program and a cell constituting the program. In addition, the VTSI 201 further includes sector information denoting where cell data to be accessed through a navigation function of the DVD is located in an actual DVD disc.

Figure 4B:
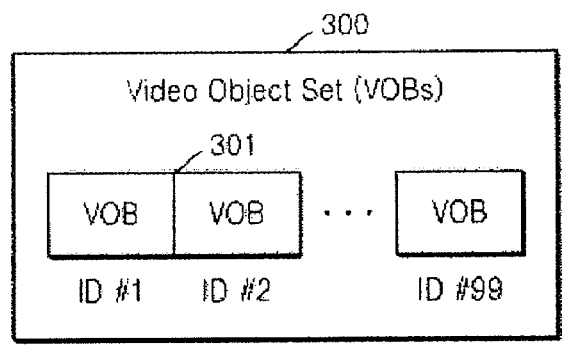

FIG. 4B illustrates a structure of video object sets (VOBs) 300 constituting a single video title. A single video title includes a combination of VOB files 301 existing as separate files. A single video title can be reproduced by sequentially reproducing the VOB files that exist as separate files. More specifically, different VOB files can be selectively reproduced in the same timeline depending on camera angle information or parental control information.

Figure 4C:
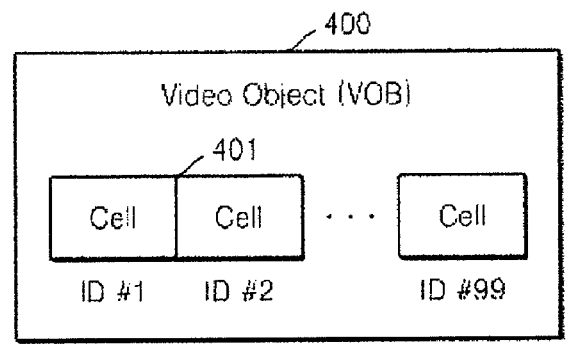

FIG. 4C illustrates a structure of a single VOB 400 constituted by a plurality of cells 401. Each of the cells 401 is used as index information for a trick mode or a seek function. In general, the VOB includes data in units of a chapter and the cell includes separate scene data.

Figure 4D:
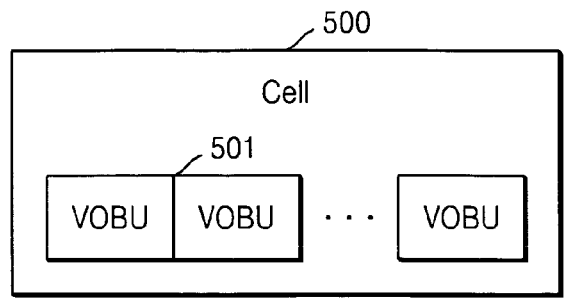

FIG. 4D illustrates a structure of a single cell 500 including a plurality of video object units (VOBU) 501. In general, the VOBU 501 includes data representing 0.5 seconds of play time and includes one or more groups of picture (GOP). For example, the VOBU 501 begins with navigation pack data containing control information and index information.

Figure 5:
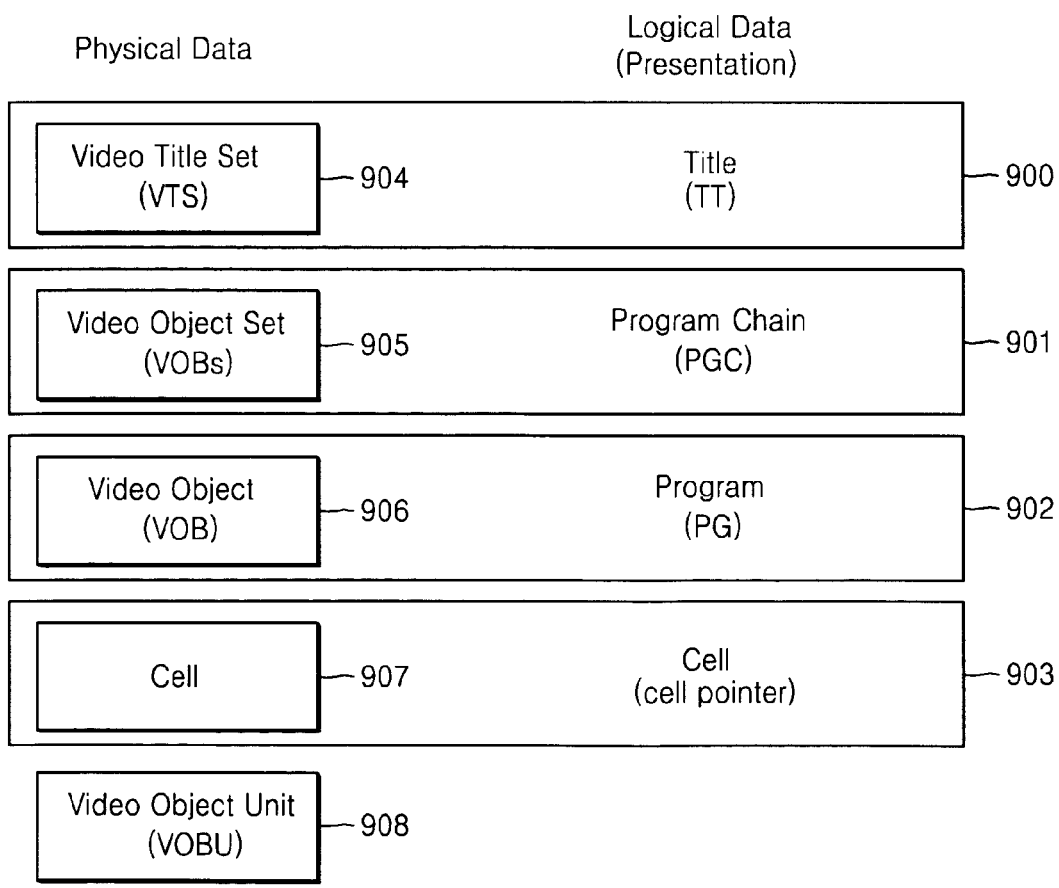
FIG. 5 is a diagram showing the relationship between physical data and logical data constituting a DVD.

FIG. 5 is a diagram showing the relationship between physical data and logical data constituting a DVD.

Logical data, i.e., presentation data, determines a grouping of DVD data and defines the reproducing order of data. The largest element of the presentation data is a title 904, which includes from 1 to 999 program chains (PGC). A first PGC 901 constituting the title is called as an entry PGC. A main menu of the title corresponds to the entry PGC. In addition, a PGC includes from 0 to 99 programs PG 902, and a program PG includes a plurality of cells 903. The presentation data and the physical data are mapped in a cell level. A final access to data on the DVD disc is performed in units of a cell.

FIGS. 6A and 6B are diagrams showing a related art DVD navigation command. The DVD navigation command shown in FIG. 6A is a command for performing a navigation operation between groups of PGs or PGCs. As described above, an IFO file of the title contains information on the PG constituting the PGC and information on the cells constituting the PG. When there is a request to navigate to a specific PGC or PG, data on a physical disc is requested in units of sector information of the cell with reference to the PG information and the cell information. FIG. 6B shows a navigation command utilized in menu screens of a video manager or a video title.

Figure 7:
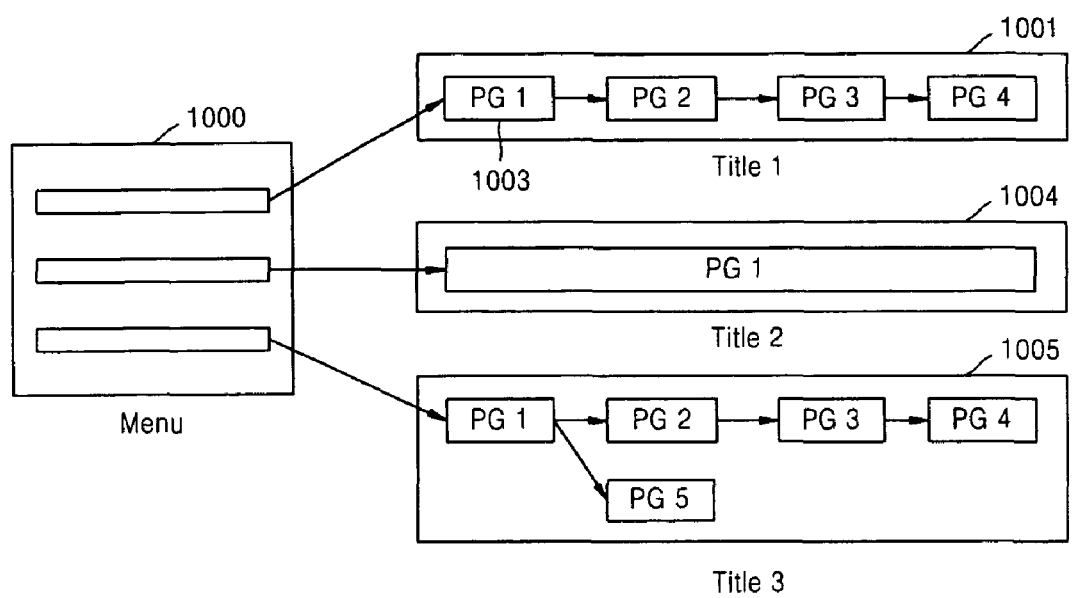
FIG. 7 is a diagram showing an exemplary structure of logical data.

FIG. 7 is a diagram showing an exemplary structure of logical data.

When a user loads a DVD disc into a DVD player, a menu screen 1000 for the video manager is displayed. When the user selects a specific title on the menu screen 1000, the menu screen is changed to a menu screen for the title or the reproduction of the title is started. By changing a camera angle during the reproduction of the title or by using settings of a parental control function, it is possible to navigate between PGCs in the same timeline. This navigation is performed between PGCs or PGs.

Figure 8:
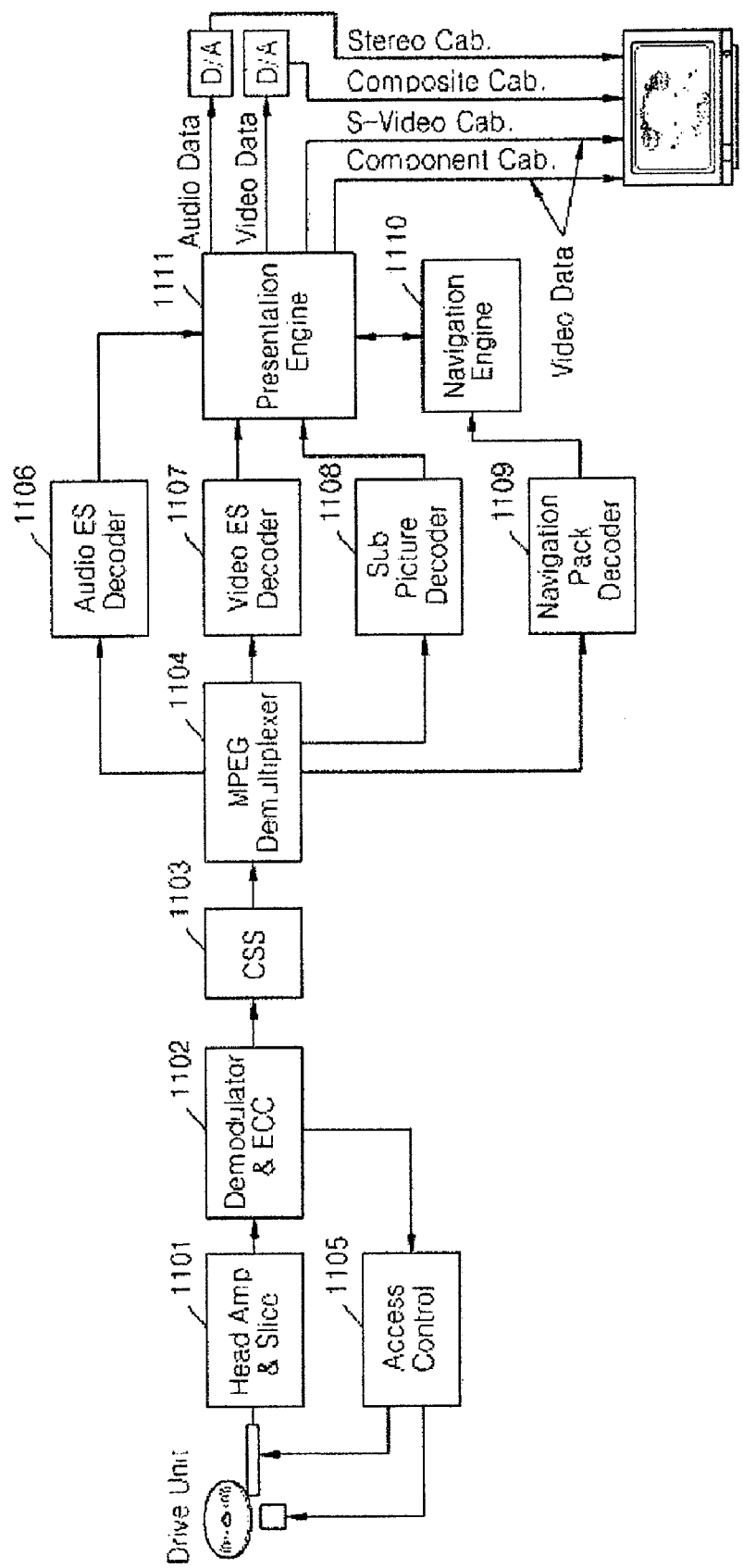
FIG. 8 is a diagram showing an exemplary structure of a related art DVD player.

FIG. 8 is a diagram showing an exemplary structure of a related art DVD player.

An MPEG demultiplexer 1104 separates data streams of video, audio, sub-picture, and navigation pack from MPEG-PS data and provides the data streams to respective decoder modules. Each of the decoder modules decodes the data streams and transmits the decoded data streams to a presentation engine 1111. The presentation engine 1111 combines the data streams according to a time code and outputs the combined data streams to a screen, thereby enabling the user to watch a film recorded in the DVD.

A navigation engine 1110 provides a function of controlling a playback sequence in a timeline such as a user interface change, a menu generation, a title change, and a camera angle change by analyzing information contained in the navigation pack. The navigation engine 1110 analyzes an input from a user via a remote controller by mapping navigation information decoded through an interaction with the presentation engine 1111 in order to screen information and performs the above-mentioned user interaction function by mapping the analyzed input from the user with the navigation information.

In DVD technology, an encrypting method using a content scrambling system (CSS) may be used to prevent copying of content. A CSS module 1103 decrypts content by using an authenticated key exchange scheme between a drive unit and a reproducing program at the time of receiving a request for reproducing the content.

Figure 9:
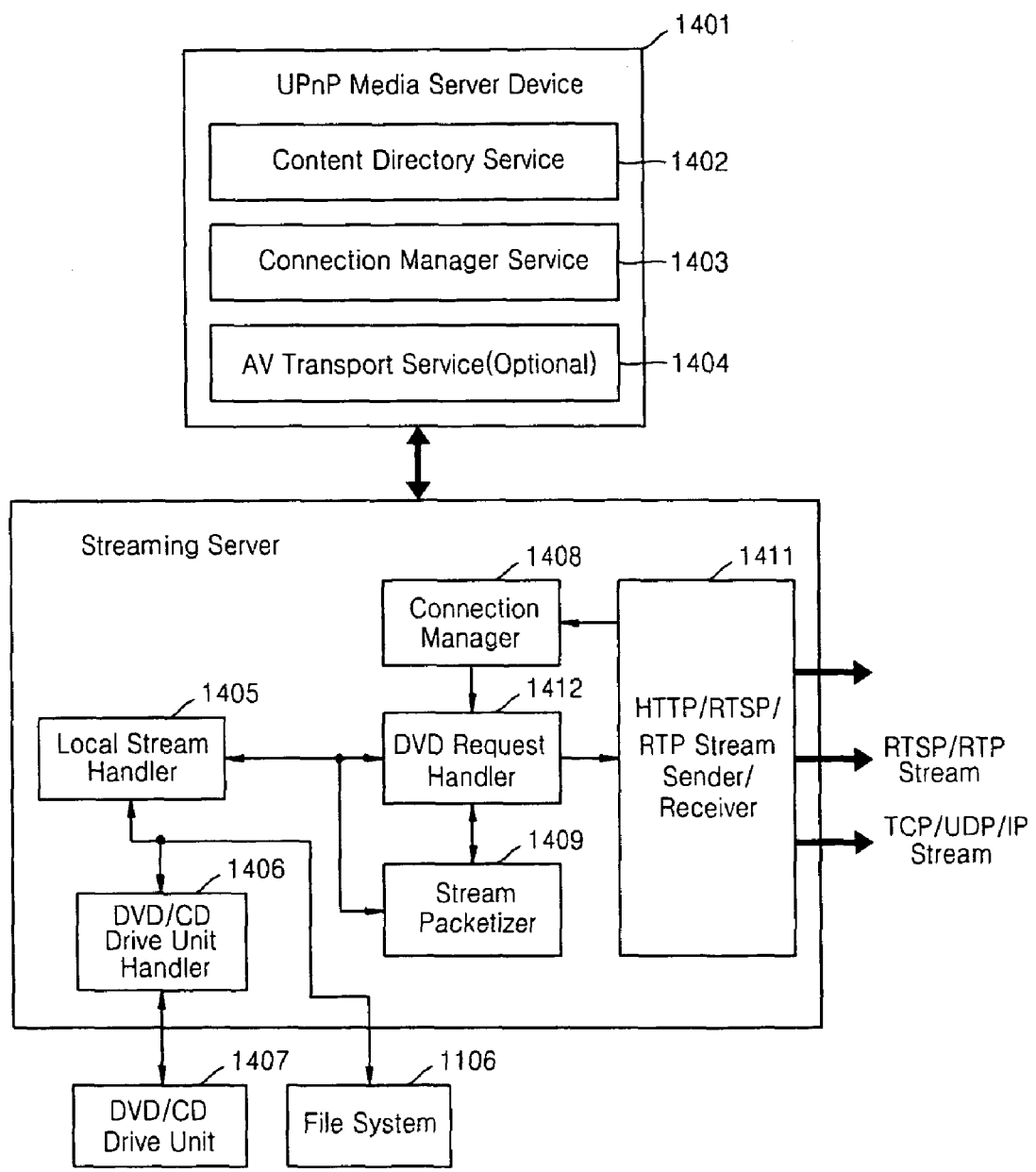
FIG. 9 is a diagram showing a structure of a UPnP media server according to an exemplary embodiment of the present invention.

FIG. 9 is a diagram showing a structure of a UPnP media server according to an exemplary embodiment of the present invention.

The UPnP media server includes a UPnP controlled device 1401 providing a device discovery function and a service discovery function defined in UPnP architecture and also includes other basic lower level operation functions and a streaming server 1411 providing actual streaming data to a streaming client. The UPnP media server device 1401 includes a content directory service module 1402 defined in the UPnP AV architecture, a connection manager service module 1403, and an optional AV transport service module 1404.

The content directory service module 1402 generates item information on the content on the basis of video manager information and transmits the content item information in response to a content browsing operation of a UPnP AV control point (CP).

The streaming server 1411 includes a remote DVD request handler 1412 as a core module of the present invention. The remote DVD request handler 1412 parses a request from the remote streaming client for sector data in a streaming protocol level, converts the parsed request for the sector data into a request for data in units of a physical DVD sector, extracts and transmits data of the requested sector to a streaming client through a local stream handler 1405 and a DVD/CD drive unit handler 1406.

Figure 10:
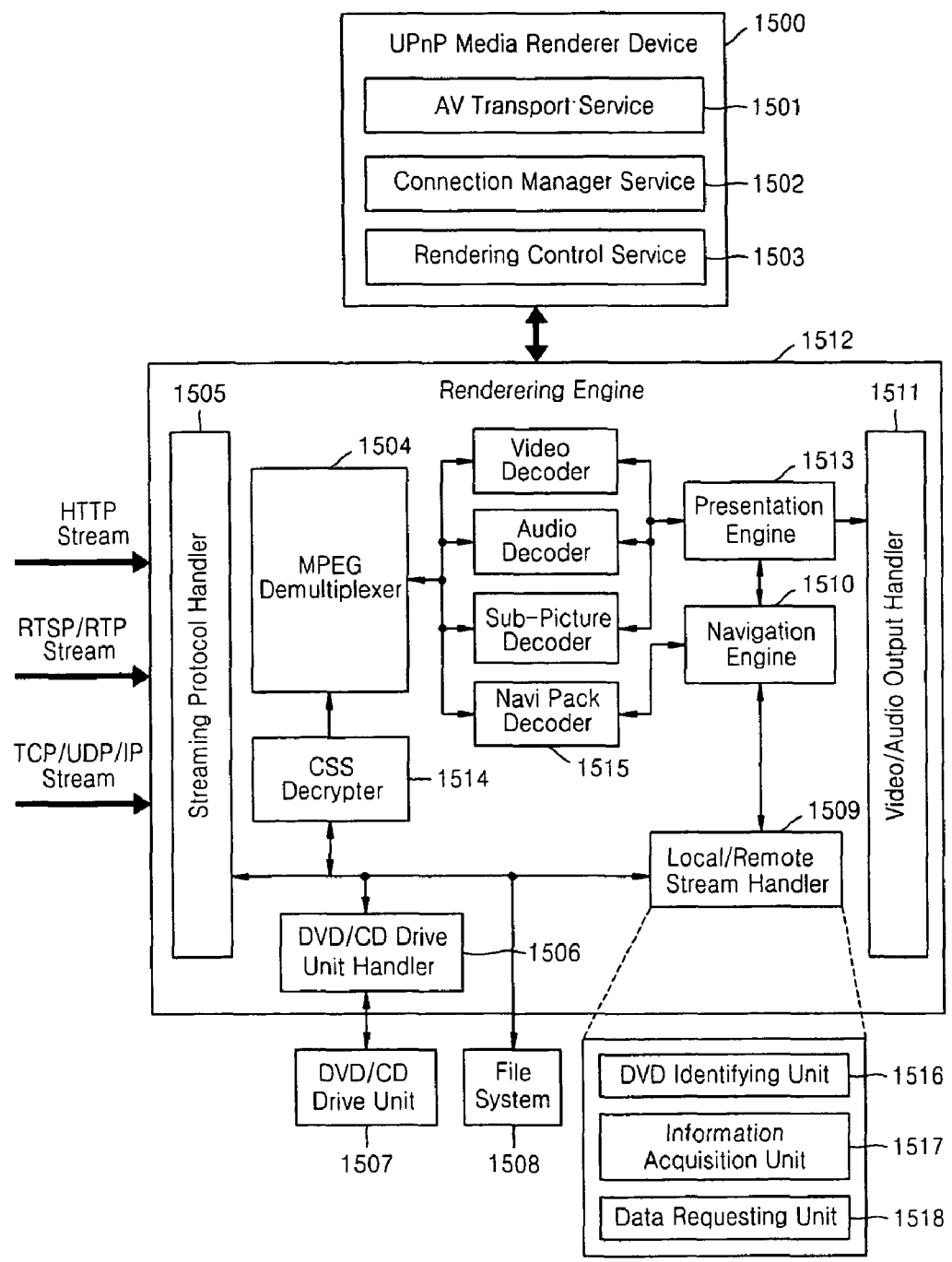
FIG. 10 is a diagram showing a structure of a UPnP media renderer according to an exemplary embodiment of the present invention.

FIG. 10 is a diagram showing a structure of a UPnP media renderer according to an exemplary embodiment of the present invention.

The UPnP media renderer according to an exemplary embodiment of the present invention includes a UPnP media renderer device 1500 and a rendering engine 1512 as the main components.

The UPnP media renderer device 1500 includes an AV transport service module 1501, a connection manager service module 1502, and a rendering control service module 1503, which are defined in the UPnP AV architecture, and the UPnP media renderer device 1500 controls respective services defined in the UPnP AV architecture.

The rendering engine 1512 receives a DVD stream from a streaming server 1411 and reproduces the DVD stream. A streaming protocol handler 1505 in the rendering engine 1512 is a module for processing protocols, such as HTTP, RTSP/RTP, and TCP/UDP/IP, used in DVD streaming.

A local/remote stream handler 1509 receives a data stream from the streaming protocol handler 1505, a local file system 1508, or a DVD/CD-ROM drive 1507 and transmits the data stream to a CSS decrypter 1514 in order to decrypt the encoded content in the data stream. The CSS decrypter 1514 receives a disc key or title key from the local/remote stream handler 1509, or the streaming server 1411, or a local drive unit handler 1506 and decrypts the data, and then transmits the data stream to an MPEG demultiplexer 1504 in order to decode encoded data in the disc key or title key.

The MPEG demultiplexer 1504 serves to classify the transmitted data stream depending on a type of data stream and transmit the classified data streams to decoders corresponding to the type of data stream. A presentation engine 1513 serves to combine data streams transmitted from the decoders and output the combined data streams to a video/audio output handler 1511 according to a corresponding time code.

A navigation engine 1510 requests data according to a user's request on the basis of navigation information, Presentation Control Information (PCI) and Data Search Information (DSI), received from a navigation pack decoder 1515. For example, when the user requests reproduction of a local DVD video, the navigation engine 1510 requests data of a corresponding sector. When the user requests reproduction of data in a remote streaming manner, the navigation engine 1510 requests data in units of a sector from the streaming server 1411 through the streaming protocol handler 1505.

The local/remote stream handler 1509, in a similar manner to the case of reproducing the local DVD video, searches information on a sector corresponding to a user's request on the basis of video manager information and video title information transmitted from the streaming server 1411, and requests data of the sector from the streaming server 1411 using a presently used streaming protocol on the basis of the searched sector information, thereby obtaining stream data required for the reproduction.

As shown in FIG. 10, the local/remote stream handler 1509, according to the present exemplary embodiment, includes a DVD identifying unit 1516, an information acquisition unit 1517, and a data requesting unit 1518. The DVD identifying unit 1516 determines whether or not the content requested for reproduction is DVD content or not on the basis of the content item information included in an AVT::SetAVTransportURI( ) call message from a UPnP CP. When the DVD identifying unit 1516 determines that the content requested for reproduction is the DVD content, the information acquisition unit 1517 requests video manager information (VMGI) and video title set information (VTSI) of the DVD content from the UPnP media server and receives the VMGI and VTSI in response to the request. The data requesting unit 1518 requests data of the DVD content in units of a sector from the UPnP media server with reference to the VMGI and VTSI.

Figure 11A:
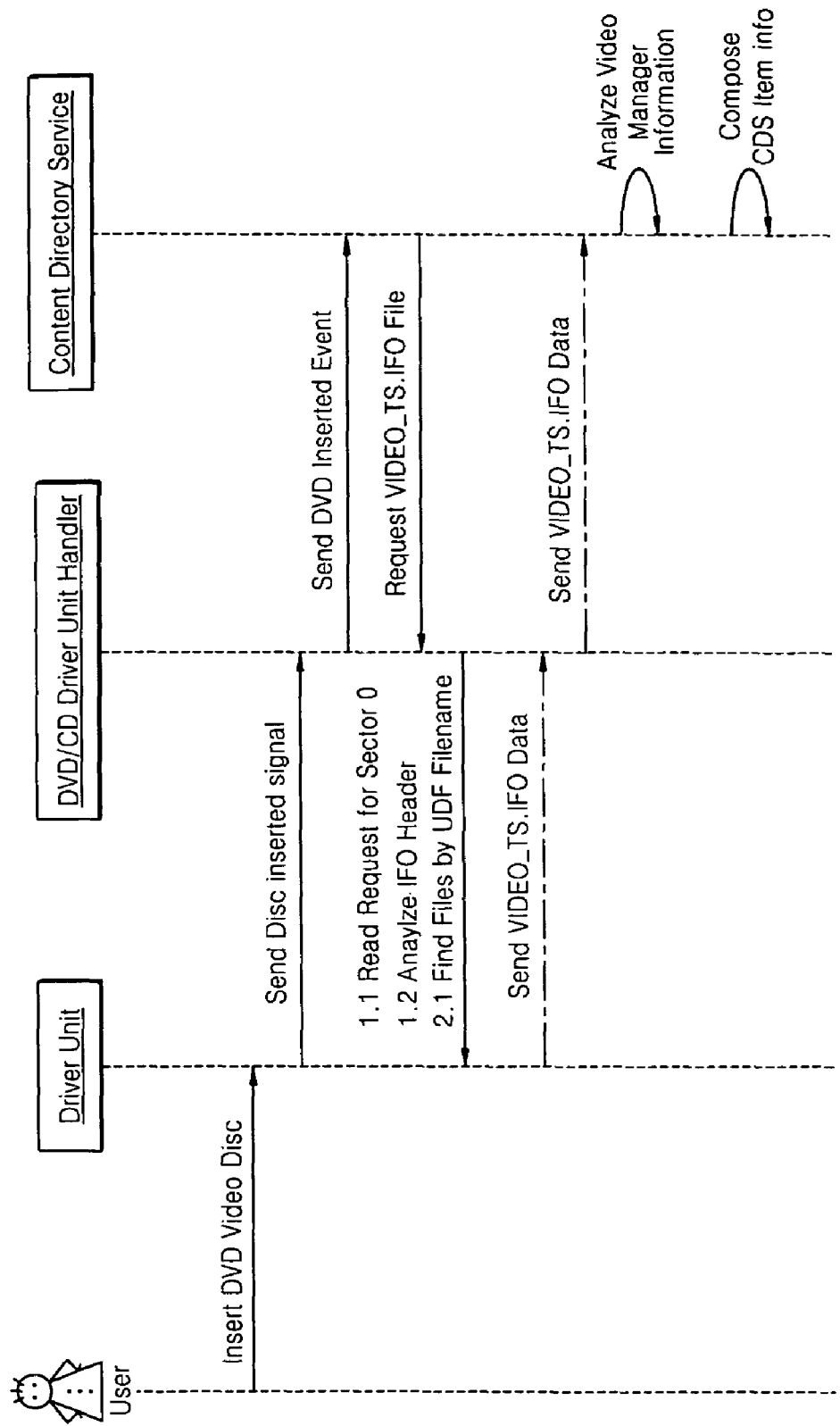
FIG. 11A is a flowchart showing operations performed when a DVD video disc is inserted into a UPnP media server according to an exemplary embodiment of the present invention.

FIG. 11A is a flowchart showing operations performed when a DVD video disc is inserted into a UPnP media server according to an exemplary embodiment of the present invention.

When the DVD disc is inserted into a drive unit 1507, the drive unit 1507 transmits a signal to a DVD/CD drive unit handler 1506. The signal triggers the execution of a content metadata analysis procedure which analyses the content directory service (CDS) 1402. Accordingly, information for the CDS is extracted from the VIDEO_TS.IFO file 101 included in the DVD video disc. The content directory service module in the UPnP media server generates content item information (CDS item information) used in the CDS by using the extracted information. The content item information is transmitted in response to a request from the UPnP AV CP requesting browsing of the content.

The content item information may have a structure as shown in FIG. 11B. The content item information shown in FIG. 11B includes a 'res' element containing URL information enabling a user to request data of the DVD video title in units of a sector. The 'res' element includes a 'ProtocolInfo' item indicating that the content is DVD content permitting access in units of a sector, as indicated in protocolInfo="http-get:*:video/mpeg:SAMSUNG.COM_FN=DVD_PS_NTSC_SUPPORT_SECTOR_ACCESS". The content item information is transmitted to the UPnP media renderer when the UPnP AV CP calls an AVT::SetAVTransportURI( ). As described above, the UPnP media renderer recognizes that the requested item for reproduction is the DVD content on the basis of the content item information and performs a series of processes for reproducing the DVD content.

Figure 12:
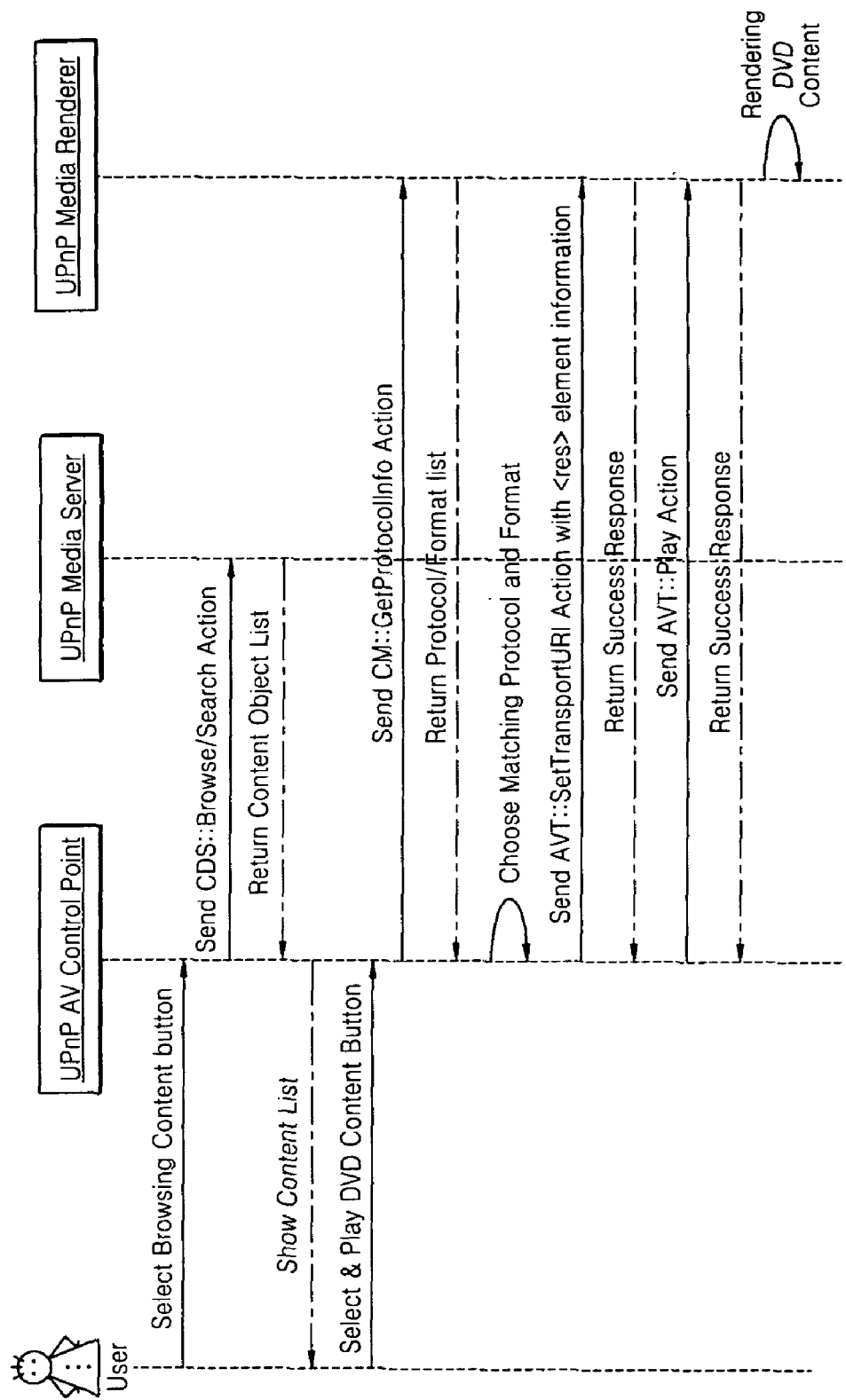
FIG. 12 is a flowchart showing a preparation process performed in a UPnP media renderer to reproduce DVD content from a UPnP media server according to an exemplary embodiment of the present invention.

FIG. 12 is a flowchart showing a preparation process performed in a UPnP media renderer to reproduce the DVD content of a UPnP media server according to an exemplary embodiment of the present invention.

A user makes a request to browse the content existing on the UPnP media server using the UPnP AV CP. The user receives a list of content in response to the user's request, selects DVD content to be reproduced from the list and a UPnP media renderer for reproducing the DVD content and requests the reproduction of the DVD content. The UPnP AV CP outputs a CM::GetProtocolInfo( ) call to the UPnP media renderer and receives a notification as a response from the UPnP media renderer that the UPnP media renderer is capable of requesting and reproducing the DVD content in units of a sector. Then, the UPnP AV CP transmits an AVT::SetTransportURI( ) call message, including universal resource indicator (URI) information and 'res' element information on the requested DVD content for reproduction, to the UPnP media renderer in order to perform the reproduction request from the user. The UPnP media renderer recognizes that the requested content for reproduction is DVD content by analyzing the 'res' element information, initializes resources required for reproduction, and transmits a response to the call message. Thereafter, the UPnP AV CP requests the reproduction of the DVD content by outputting an AVT::Play action call to the UPnP media renderer.

Figure 13A:
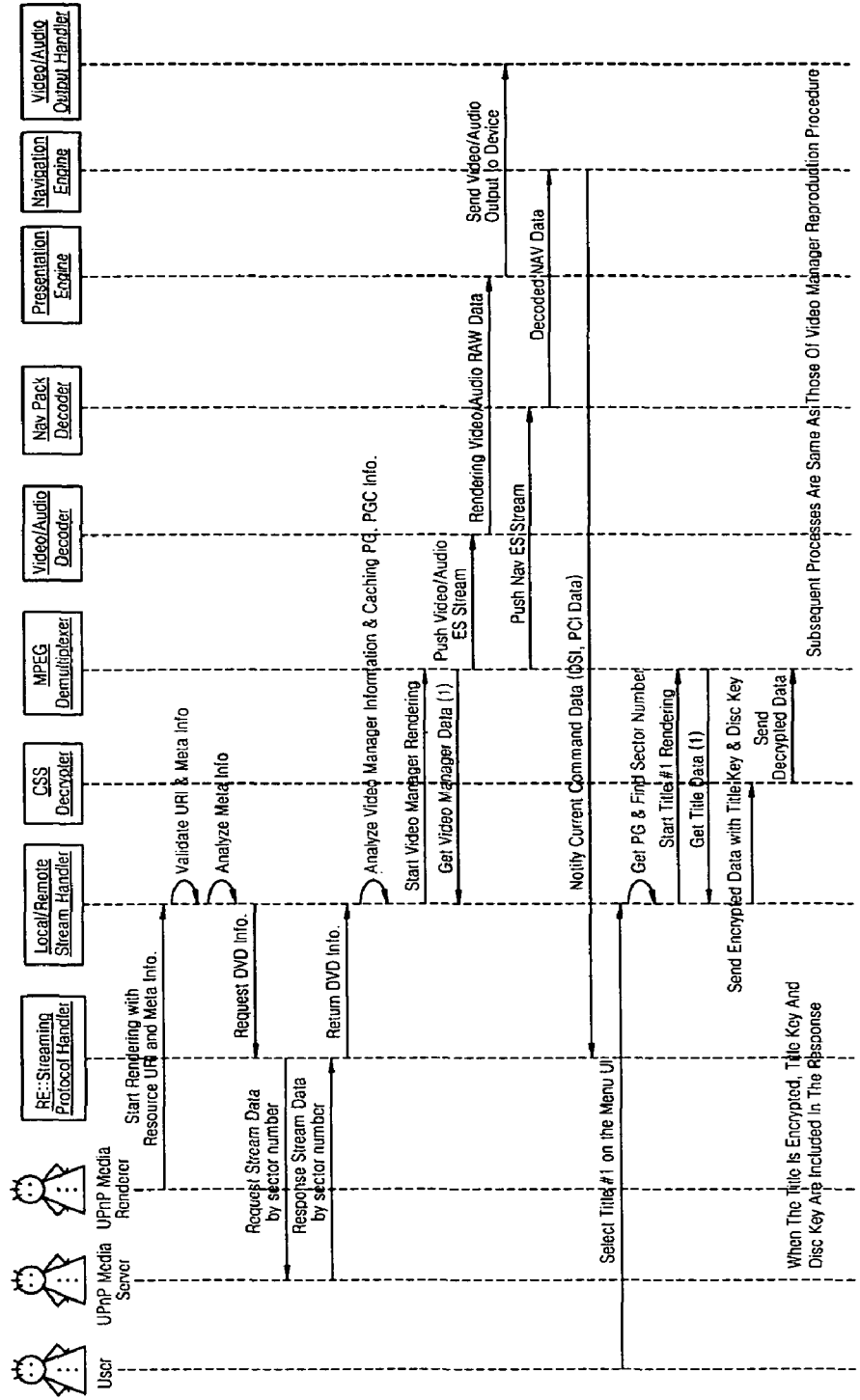
FIG. 13A is a flowchart showing a process performed in a UPnP media renderer to reproduce DVD content from a UPnP media server according to an exemplary embodiment of the present invention.

FIG. 13A is a flowchart showing a process performed in a UPnP media renderer to reproduce DVD content from a UPnP media server according to an exemplary embodiment of the present invention.

A UPnP media renderer device transmits item information, including the URI information and 'res' element information on the DVD content, to the local/remote stream handler 1509 of the rendering engine. As described above, the item information is transmitted from the UPnP AV CP included in the AVT::SetTransportURI( ) call message. The local/remote stream handler 1509 checks validity of the URI information and recognizes that the format of the request media for reproduction corresponds to the DVD content on the basis of metadata information included in the 'res' element.

After the rendering engine 1512 recognizes that the requested content for reproduction is the DVD content, the rendering engine 1512 requests video manager information and video title information to the UPnP media server. The request format is in units of a sector. First, information on the payload length of the video manager information is obtained by reading a sector at address 0 and data of the sectors corresponding to the payload is requested.

Thereafter, sector information of the video title set information is obtained from the video manager information, thereby obtaining the entire video title set information of the entire title included in the DVD disc. The local/remote stream handler 1509 requests data in units of a sector from the UPnP media server through the streaming protocol handler 1505. When the local/remote stream handler 1509 provides sector information on the requested data to the streaming protocol handler 1505, the streaming protocol handler 1505 generates a data request message suitable for the streaming protocol on the basis of the requested sector information and transmits the data request message to a streaming server 1411 of the UPnP media server. FIG. 13B shows a message structure for requesting data in units of a sector using an HTTP protocol.

When the streaming server 1411 receives the data request message as shown in FIG. 13B, the streaming server 1411 transmits data of the requested sector. When the data for transmission is encrypted using the CSS, the streaming server 1411 transmits a response message including the disc key and title key obtained by a CSS authentication process in accordance with an Application/Vnd.pwg-multiplexed MIME type transmission scheme. In this case, a HTTP header includes a disc key field and a title key field indicating that the disc key and the title key are included in the response message. FIG. 13C shows an example of the response message in the case where the data of the requested sector for transmission is encrypted using the CSS.

The local/remote stream handler 1509 stores information on a relationship between PGC information and a PG obtained from the video title set information and information on cells constituting the PG, and collectively manages information on sectors which are formed on the DVD disc and correspond to cell locations. In addition, the local/remote stream handler 1509 obtains information on a sector recording the video manager data based on the video manager information and requests data of the corresponding sector. The rendering engine 1512 starts to reproduce a main menu screen of the DVD by using the data of the sector.

The MPEG demultiplexer 1504 separates an elementary stream from multiplexed MPEG-2 PS streams in accordance with the type of data stream and transmits the streams to corresponding decoders. NAV pack data in the separated elementary stream is separated into PCI and DSI data by a NAV decoder and transmitted to the navigation engine 1110.

The navigation engine 1110 transmits action information, screen position information, and the like that can be performed in the present timeline to the local/remote stream handler 1509. The local/remote stream handler 1509 requests data recorded on a corresponding section of the DVD disc, for navigating a title or for outputting a result of a menu selection in accordance with an input from a user, on the basis of the information.

The exemplary embodiments of the present invention can be written as computer programs and can be implemented in related art digital computers that execute the programs using a computer readable recording medium. Examples of the computer readable recording medium include magnetic storage media (e.g., ROM, floppy discs, hard discs, etc.), and optical recording media (e.g., CD-ROMs, or DVDs).

According to the exemplary embodiments of the present invention, the user can utilize various functions provided by the DVD video similar to reproducing DVD content through a local DVD player while reproducing DVD content stored in a remote server through devices of a home network. In addition, it is possible to reduce concerns of the DVD copyrighter about illegal copying of the content since encoded data is transmitted as it is, without being decoded.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing a Digital Versatile Disk (DVD) content of a server through a home network, the method comprising:
   (a) transmitting item information indicating DVD content in response to a request for a content list; and
   (b) receiving a request for the DVD content in units of a sector based on the transmitted item information, and extracting and transmitting data of the requested sector, wherein the sector represents a physical location on the DVD,
   wherein the item information includes information indicating that request of the DVD content is permitted in units of a sector, and a Uniform Resource Identifier (URI) of the DVD content,
   wherein the home network is based on a Universal Plug and Play audio video (UPnP AV) architecture, and the information indicating that request of the DVD content is permitted in units of a sector is transmitted to a UPnP AV control point (CP) in response to a CDS::Browse( ) call from the UPnP AV CP.

2. The method of claim 1, further comprising generating the item information with reference to video manager information of the DVD content.

3. The method of claim 1, wherein in (b), if the data of the requested sector is encrypted using a Content Scrambling System (CSS), the data of the requested sector is transmitted together with a disc key and a title key for decrypting the data.

4. The method of claim 1, wherein the home network is based on a Universal Plug and Play audio video (UPnP AV) architecture, and in (a), the item information is transmitted to a UPnP AV control point (CP) in response to a CDS::Browse( ) call from the UPnP AV CP.

5. The method of claim 4, wherein the item information is received through an AVT::SetAVTransportURI( ) call message from the UPnP AV CP.

6. A non-transitory computer-readable medium having embodied thereon a computer program for performing a method of providing a Digital Versatile Disk (DVD) content of a server through a home network, the method comprising:
   (a) transmitting item information indicating DVD content in response to a request for a content list; and
   (b) receiving a request for the DVD content in units of a sector based on the transmitted item information, and extracting and transmitting data of the requested sector, wherein the sector represents a physical location on the DVD,
   wherein the item information includes information indicating that request of the DVD content is permitted in units of a sector, and a Uniform Resource Identifier (URI) of the DVD content,
   wherein the home network is based on a Universal Plug and Play audio video (UPnP AV) architecture, and the information indicating that request of the DVD content is permitted in units of a sector is transmitted to a UPnP AV control point (CP) in response to a CDS::Browse( ) call from the UPnP AV CP.

7. A server for providing Digital Versatile Disk (DVD) content through a home network, the server comprising:
   a list request processor which transmits item information indicating DVD content in response to a request for a content list; and
   a remote request processor which receives a request for the DVD content in units of a sector based on the transmitted item information, and extracts and transmits data of the requested sector, wherein the sector represents a physical location on the DVD, wherein the item information includes information which indicates that request of the DVD content is permitted in units of a sector, and a Uniform Resource Identifier (URI) of the DVD content, wherein the home network is based on a Universal Plug and Play audio video (UPnP AV) architecture, and the information indicating that request of the DVD content is permitted in units of a sector is transmitted to a UPnP AV control point (CP) in response to a CDS::Browse( ) call from the UPnP AV CP.

8. The server of claim 7, wherein the list request processor generates the item information with reference to video manager information of the DVD content.

9. The server of claim 7, wherein the remote request processor transmits the data of the requested sector together with a disc key and a title key for decrypting the data if the data of the requested sector is encrypted using a Content Scrambling System (CSS).

10. The server of claim 7, wherein the home network is based on a Universal Plug and Play audio video (UPnP AV) architecture, and the list request processor transmits the item information to a UPnP AV control point (CP) in response to a CDS::Browse( ) call from the UPnP AV CP.

11. The server of claim 10, wherein the item information is received through an AVT::SetAVTransportURI( ) call message from the UPnP AV CP.

* * * * *